Patented July 14, 1925.

1,545,993

UNITED STATES PATENT OFFICE.

JULIUS ALSBERG, OF CHICAGO, ILLINOIS.

PROCESS OF EMULSIFICATION.

No Drawing.   Application filed July 20, 1921.  Serial No. 486,297.

*To all whom it may concern:*

Be it known that I, JULIUS ALSBERG, a citizen of the United States, residing at Chicago, in the county of Cook and State of Illinois, have invented certain new and useful Improvements in a Process of Emulsification; and I do hereby declare the following to be a full, clear, and exact description of the invention, such as will enable others skilled in the art to which it appertains to make and use the same.

The object of my invention is an effective and economical method of making emulsions of characteristic materials, such as flavoring materials, oils, fats, waxes esters, ethers, etc., in aqueous solutions, in which they are not soluble or sparingly soluble.

This process is particularly adapted for the preparation of flavoring emulsions to take the place of alcoholic extracts around which the law has now placed restrictions and difficulties, as well as oily polishes medicinal compounds and similar products.

In making emulsions of this nature where the characteristic material, as for example a flavoring material, forms only a small percentage of the total volume of the emulsion, I have found that with the ordinary processes of emulsification, by means of an excipient, such as gum arabic, and glycerin to prevent drying of the mixture, the liquid emulsion while first apparently complete, will not be stable and after being allowed to stand for a short time the emulsion will separate into layers, the lower layer consisting of the clear diluent and the upper layer of the milky characteristic material.

Microscopic examination reveals that the lower clear layer is practically free from globules of the flavoring or characteristic material, whereas in the upper milky layer the globules are crowded together practically touching each other, with the diluent in the interstices. The upper crowded layer will remain in this condition indefinitely even if placed in a centrifuge. If sufficient quantity of the characteristic or flavoring material could be added we could crowd the diluent full of globules from top to bottom and thus obtain a truly stable homogeneous emulsion.

But with the small amount of characteristic material desired in the emulsion, in the case of flavoring material from 5% to 6% it is evident that not enough globules of the same can be obtained by any known method of subdivision to make such a stable homogeneous emulsion.

I have discovered that I can obtain such a stable homogeneous emulsion by adding to the characteristic material a sufficient quantity of an inexpensive neutral material, which is insoluble in the diluent but is emulsifiable with the characteristic material, and in the case of a flavoring material is edible or non injurious to the human system, to act as a filler and when emulsified in conjunction with the characteristic material completely to fill the diluent with globules, and thus form a stable homogeneous liquid emulsion, which will have no more than the desired quantity of the flavoring or characteristic material.

In order that my invention may be fully understood and carried into effect, I shall first describe in detail the application of my process to the making of a flavoring emulsion, and then particularly point out the invention in the claims.

The particular emulsion whose making I shall describe is one of oil of lemon of 625% volume standard, the quantities of ingredients specified being for the production of one gallon of the preparation.

Two and 102/1000 (2.102) pounds of acacia (gum arabic) the preferred excipient are dissolved, cold in 522/1000 (0.522) gallons of water and the diluent solution or mucilage thus formed is passed through a centrifuge or De Laval separator to remove dirt and foreign matter.

The clear gum solution or mucilage is now run into a closed and jacketed mixer, the jacket having steam and cold water connections, and the mixer being provided with fairly rapidly rotating paddles. Here two and 290/1000 (2.290) pounds of glycerin, U. S. P. to prevent drying of the mixture, of a specific gravity of 1.246, is added to the gum solution or mucilage and steam turned into the jacket. The mixture is constantly agitated, heated to and maintained at a temperature of 190 degrees Fahrenheit, for a period of time of not less than twenty minutes duration. The steam is then cut off and cold water turned into the jacket to bring the mixture to ordinary room temperature as quickly as possible.

In a separate vessel, 625/10000 (0.0625) gallons of oil of lemon should be mixed with the filler, in this instance 576/10000 (0.0576) gallons of oil of mustard seed, the vessel in which it is mixed being preferably of a closed type and of a capacity not greatly in excess of the gross volume of the two oils; this prevents considerable loss by volatilization. Vigorous agitation should be employed to thoroughly mix the two oils.

The two oils are now transferred to the mixer containing the gum and glycerin solution, the mixer closed, and the contents agitated, cold, until complete incorporation of the several ingredients, one with another, is had.

From the mixer, the batch of oils, glycerin, gum and water, is fed to a homogenizer having a discharge valve regulated, preferably, to give a pressure of 3500 to 4000 pounds per square inch, to insure the production of oil globules of sufficiently small size.

When emulsification is completed, the emulsion should be discharged from the homogenizer and run into a closed receiving or storage tank.

When it is desired to color the product, this may be best accomplished by adding the coloring matter, previously dissolved in water, to the emulsion in the receiving or storage tank. For dissolving the coloring matter, a small portion of water is taken from the 522/1000 (0.522) gallons referred to above, as being employed to dissolve the gum acacia at the outstart.

The emulsion formed under this process and formula is of a consistence not greater than that of a thin syrup, pouring freely, and possessing none of the viscid properties common to emulsion flavors prepared in the conventional manner. It readily lends itself to free and equal distribution in cake and candy batches and the like and avoids the untoward effects frequently produced in such batches because of the rapid evaporation of the alcohol from alcoholic extracts. The oils and glycerin, of course, have a food value of which alcohol is devoid.

The process described is subject to many modifications and the character and proportion of the ingredients may be changed to take care of varied demands and altered conditions. The resulting compound is in all cases of permanent character, due to the minute globulization of the characteristic material and the filler, the complete occupation of the diluent, the increased viscosity of the diluent and the reduction of the surface tension of the latter.

Separate emulsification of the characteristic material and of the filler in the diluent may be effected, followed by incorporation one with another, without departing from the spirit of the invention.

Referring now to a more detailed description of the various steps, it is proper to say that tragacanth, or some other water soluble gum may be used as the excipient in place of acacia, but gums which merely swell and do not dissolve are to be avoided. When the solution of gum (mucilage) and glycerin are mixed, heat is employed to destroy enzymes present in the solution or mucilage, and to pasteurize the mixture, such pasteurization preventing the subsequent souring of the mucilage and aiding in producing a permanent product. The glycerin with its antiseptic properties not only aids the preservation of the emulsion but increases viscosity of water without using a large proportion of gum.

While oil of mustard seed is recommended as the filler in the case of flavoring emulsions because of its cheapness, its negative character, and its peculiar physical characteristics, oil of gossypium seminis or other vegetable (and mineral) oils may be employed in its stead.

The employment of pressure of 3500 pounds per square inch is desirable to obtain very minute oil globules but pressure in excess of 4000 pounds per square inch may produce undue wear and tear upon the machine and increases the operative cost, although an even finer emulsion is obtained under the higher pressure.

I claim as my invention:

1. The process of making a stable homogeneous liquid emulsion of a characteristic material in a diluent in which it is insoluble but emulsifiable and in a proportion too small to fill the diluent with its extremely subdivided globules, which consists in adding to the diluent an excipient and to the characteristic material a sufficient quantity of a negative insoluble but emulsifiable filler completely to fill the diluent with the extremely subdivided globules of both, in mixing the characteristic material and the filler in the prepared diluent and in agitating the mixture.

2. The process of making a stable homogeneous liquid emulsion of a characteristic material in a diluent in which it is insoluble but emulsifiable and in a proportion too small to fill the diluent with its extremely subdivided globules, which consists in adding to the diluent an excipient and glycerin, and to the characteristic material a sufficient quantity of a negative insoluble but emulsifiable filler completely to fill the diluent with the extremely subdivided globules of both, and in mixing the characteristic material and the filler in the prepared diluent, and in agitating the mixture.

3. The process of making a colored stable homogeneous liquid emulsion of a characteristic material in a diluent in which it is insoluble but emulsifiable and in a proportion too small to fill the diluent with its extremely subdivided globules, which consists in adding to the diluent an excipient and to the characteristic material a sufficient quantity of a negative insoluble but emulsifiable filler completely to fill the diluent with the extremely subdivided globules of both, in mixing the characteristic material and the filler in the prepared diluent, and in adding coloring matter to the emulsion thus formed after agitation.

4. The process of making a stable homogeneous liquid emulsion of a characteristic material in a diluent in which it is insoluble but emulsifiable and in a proportion too small to fill the diluent with its extremely subdivided globules, which consists in adding to the diluent an excipient, in destroying the enzymes by heat, in adding to the characteristic material a sufficient quantity of a negative insoluble but emulsifiable filler completely to fill the diluent with the extremely subdivided globules of both, in mixing the characteristic material and the filler in the prepared diluent, and in agitating the mixture.

5. The process of making a stable homogeneous liquid emulsion of a flavoring material in a diluent in which it is insoluble but emulsifiable and in a proportion too small to fill the diluent with its extremely subdivided globules, which consists in adding to the diluent an excipient and to the flavoring material a sufficient quantity of a negative edible, insoluble but emulsifiable filler completely to fill the diluent with the extremely subdivided globules or both, in mixing the flavoring material and filler in the prepared diluent and in agitating the mixture.

6. The process of making a stable homogeneous liquid emulsion of a characteristic material in an aqueous solution in a proportion too small completely to fill the aqueous solution with its extremely subdivided globules, which consists in adding to the aqueous solution an excipient, in adding to the characteristic material a sufficient quantity of a negative oil completely to fill the aqueous solution with the extremely subdivided globules of both, in mixing the characteristic material and the negative oil in the prepared aqueous solution and in agitating the mixture.

7. The process of making a stable homogeneous liquid emulsion of a characteristic material in an aqueous solution, in a proportion too small completely to fill the aqueous solution, which consists in adding to the water an excipient, in adding to the characteristic material a sufficient quantity of oil of mustard seed completely to fill the aqueous solution with the extremely subdivided globules of both, in mixing the characteristic material and the oil of mustard seed in the prepared aqueous solution, and in agitating the mixture.

8. The process of making a stable homogeneous 5% to 6% emulsion of a flavoring material in an aqueous solution, which consists in using about the following proportions, to wit: adding to about ½ gal. of water about 2 pounds of an excipient as gum arabic, in adding to about .06 gals. of the flavoring material about an equal quantity of oil of mustard seed, in mixing the flavoring material and the oil of mustard seed in the prepared aqueous solution, and in agitating the mixture.

9. The process of making a stable homogeneous 5% to 6% emulsion of a flavoring material in an aqueous solution, which consists in using about the following proportions, to wit: in adding to about ½ gal. of water, about 2 pounds of an excipient as gum arabic, and about 2.3 pounds of glycerin, in adding to about .06 gals. of the flavoring material about an equal quantity of oil of mustard seed, in mixing the flavoring material and the oil of mustard seed in the prepared aqueous solution and in agitating the mixture.

10. A stable homogeneous liquid emulsion consisting of a solution of an excipient as gum arabic in water, completely filled with minutely subdivided globules of a mixture of a characteristic material and a negative filler.

11. A stable homogeneous liquid emulsion consisting of a solution of an excipient as gum arabic and glycerin in water, completely filled with minutely subdivided globules of a characteristic material and a negative filler.

12. A stable homogeneous liquid emulsion consisting of a solution of an excipient as gum arabic in water completely filled with minutely subdivided globules of a flavoring material and a negative filler oil.

13. A stable homogeneous liquid emulsion consisting of a solution of an excipient as gum arabic in water completely filled with minutely subdivided globules of a flavoring material and oil of mustard seed.

14. A stable homogeneous liquid emulsion consisting of a solution of an excipient as gum arabic and glycerin in water completely filled with minutely subdivided globules of a flavoring material, and oil of mustard seed.

In testimony whereof I affix my signature.

JULIUS ALSBERG.